Jan. 29, 1952     F. WEYERHAEUSER     2,583,618
PRODUCTION OF HOT-MOLDED ARTICLES FROM WOOD SAWDUST
Filed July 23, 1948
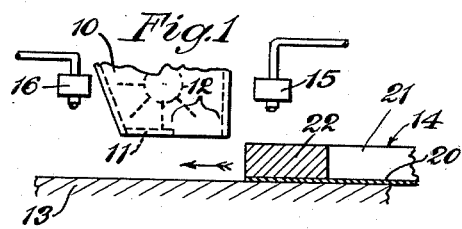
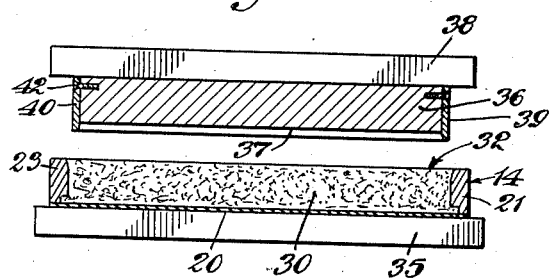
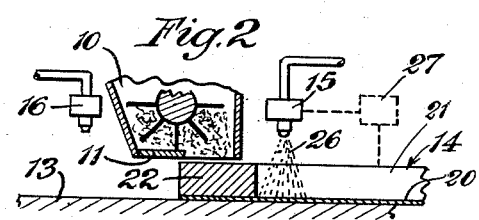
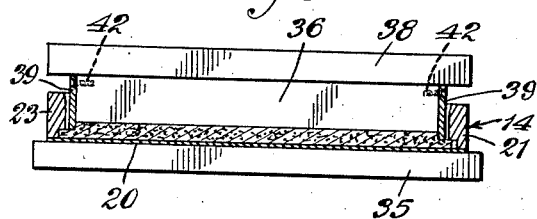
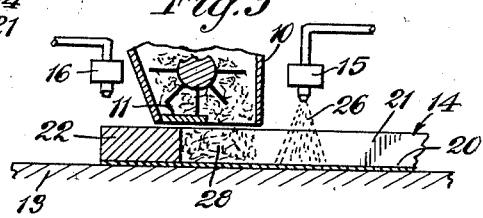
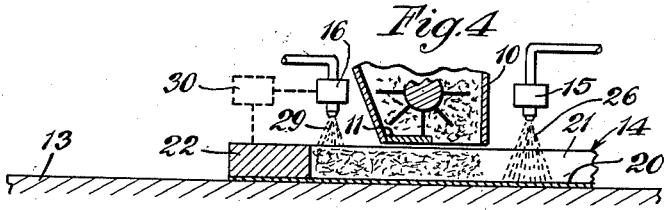
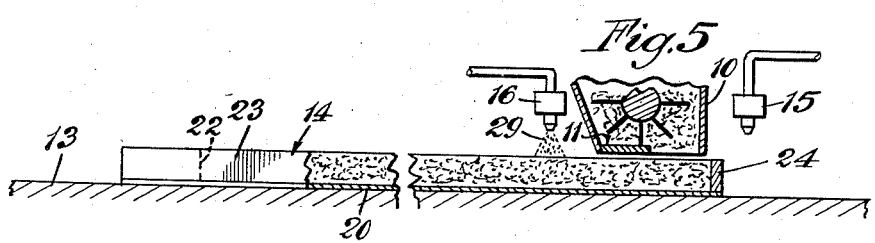
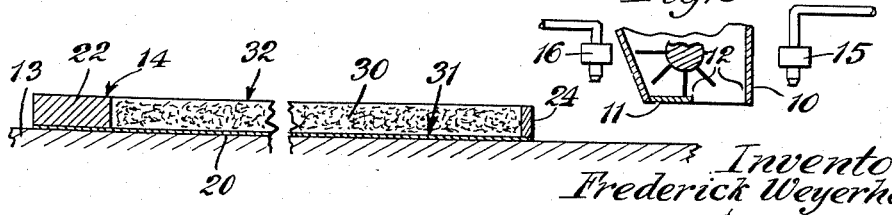
Inventor
Frederick Weyerhaeuser
by W. Bartlett Jones,
Attorney.

Patented Jan. 29, 1952

2,583,618

UNITED STATES PATENT OFFICE 2,583,618

PRODUCTION OF HOT-MOLDED ARTICLES FROM WOOD SAWDUST

Frederick Weyerhaeuser, St. Paul, Minn., assignor to Rock Island Millwork Company, Rock Island, Ill., a corporation of Illinois Application July 23, 1948, Serial No. 42,263

15 Claims. (Cl. 18—55)

The present invention relates to the formation of molded bodies from sawdust, and in particular to the formation of board-like panels. It is well known to heat masses of sawdust and binder under pressure to form molded bodies and especially flat board-like panels. The present invention relates to improvements in such processing and has for its general object the attainment of such articles with greater strength, with a high degree of perfection, with improved dimensional stability, with surfaces of high quality and smoothness, with suitability for milling and machining, with improved resistance to swelling by water, as in water paints, glues, and the like, and with general uniformity in character and density of a panel from face to face.

In order to explain the general objects and advantages of the present invention, the defects of prior art processes and practices are presented as now found in retrospect from knowledge acquired through the present invention. To the uninitiated, it is pointed out that green sawdust from a sawmill usually derives from green lumber and it has from 60 to 80 parts by weight of water to 100 parts of wood substance, i. e., bone dry wood. Hereinafter, the term "wood" refers to bone dry wood substance, and the terms "water content" or "percent water," "moisture content," or "percent moisture," refer to parts by weight of water per 100 parts of bone dry wood. Sawdust from a millwork plant is a more uniformly dry product, because the wood employed for millwork is dried to a maximum of 12% moisture content.

By making a mixture of an adhesive binder, such as a dry, finely ground thermosetting resin, with dry wood sawdust, such as millwork sawdust or dried sawmill sawdust, the mixture may be molded under heat and pressure into various forms, for example, a panel when placed in a platen press. Commercial platen presses open and close relatively slowly. The platens are continuously heated, say to 350° F., as they slowly close together upon and compress and heat to bond a bulk mass of said mixture to be molded.

Water is an excellent plasticizer for wood and when wet wood is heated under pressure it readily changes shape and becomes densified before it dries out, and when it dries it acquires a permanent set. However, dry wood heated and processed is more resistant to change of shape and any resulting compression is to a greater degree lost upon wetting and subsequent drying.

Accordingly, when a dry mixture of sawdust and binder is to be pressed in a platen press, the relatively dry top grains or particles of the mixture become heated and dried out as the press slowly closes and before the full pressure is exerted on them. As a result, they lose their small moisture content and, being set against change of shape in the pressing operation, the said grains do not mesh well with each other to form a homogeneous solid layer in the final panel. In fact, some grains may even be ruptured. The poor meshing and any rupturing cause voids and pores, lower surface density and strength, and poor surface bond with danger of chipping at the surface and edges.

As the surface layers are so dried out, the normal moisture content of said top grains is driven out of the grains promptly after the first contact with the hot platens or other surfaces, and a useful portion of the released vapor moves as such into the cooler interior of the mass being molded, where it condenses and wets the inner grains. Before the wetted inner grains can be dried by the heat from the platens, they are compressed, and being more plastic they change shape and fit together with a notable absence of inter-particle voids. Thus, the interior layers of such a panel are characteristically different from the exterior layers, and the defects of the resulting panel may be described in terms of the relative differences between the inner and outer layers thereof.

The surface layers are less dense and more pitted or porous than the interior layer because of the better meshing of the wetted and plasticized particles of the inner layer. The interior particles acquire greater density than the surface-located particles because the wet grains are more easily densified under the heat and pressure than are the quickly dried outer grains. The hot compressing operation described effects the difference in the moisture content in spite of the fact that initially the moisture content of the original dry mass may be entirely uniform. The panel is also weaker than if it were of a uniform structure and density corresponding to the structure and density of the inner layer. The compressed dry particles at the surface swell more on contact with water, as from water paints, and the pores allow water to penetrate to the interior of the panel.

Where the surface is to be finished, the relatively defective surface layer of the panel needs sanding towards the interior to minimize the pits formed therein by the failure of the quickly set particles fully to mesh with each other. Also the surface particles are relatively poorly bonded into place, and they tend to chip out on milling or machining the surface layer or at edges formed by cross-cutting the panel.

Since the inner layers of the panel have the more desirable properties, and the outer layers have the least desirable properties with defects as described, the present invention aims to effect structures wherein the outer and inner layers have desirable properties uniformly throughout the panel comparable to the desirable inner layers above described.

It is an object of the invention to form integrated panels from a substantially dry sawdust mixture containing suitable bonding material, while securing the benefits of the presence of water.

It is a particular object of the present invention to control the effects of heat upon an overall dry mass being molded, by special control of moisture quantity and location.

It is a particular object of the invention to provide a supply of free water at the surfaces of a substantially dry sawdust mass to be subjected to a source of heat and pressure, as in hot-molding.

Various other and ancillary objects and advantages of the present invention will become apparent from the following description and explanation of the invention as it is hereinafter set forth in connection with the accompanying drawings, in which:

Fig. 1 is a diagrammatic representation of a traveling tray about to be filled from the illustrated hopper with a sawdust mixture for molding to form a board-like panel.

Fig. 2 is a view similar to Fig. 1 showing the tray progressed to a point where an application of spray of water is made on the bottom of the tray.

Fig. 3 is a similar view showing the tray further progressed to the point where the sawdust mixture begins to enter the tray on top of the wetted tray bottom.

Fig. 4 is a similar view wherein the tray has progressed to a point where a spray of water is applied to the top of the sawdust mixture in the tray.

Fig. 5 is a similar view showing the tray progressed to the point where the first water spray is cut off while the second spray for the top of the sawdust mix still functions and the tray is substantially filled.

Fig. 6 is a similar view showing the tray completely filled and prepared for molding after leaving the hopper and the area of the spray.

Fig. 7 is a diagrammatic view in vertical cross-section showing the filled tray of Fig. 6 resting on a heated platen in position about to receive a heated punch platen to compress and mold the fill.

Fig. 8 is a view similar to Fig. 7 showing the two platens in final molding position.

Although the invention is described and illustrated by reference to the preferred embodiment thereof to make panels, or synthetic sheet lumber, it is to be understood that the principles which function in making panels likewise function in making other and non-planar or irregular forms. Consequently, the invention is not to be considered as limited to or by the embodiment illustrated in the drawings and hereinafter described in detail, but rather it is to be considered as otherwise applied, within the scope of the appended claims.

It has been found that a panel board made from dry sawdust as described above, has a tendency to thicken with exposure to moisture, and that this tendency is progressively less from the surface layers to the center layer. This phase was studied by hot-pressing with platens at 350° F. two wooden boards from an original thickness of one inch (1"), to a less thickness of one-half inch (½"), one board being normally an air-dry board, and the other being first soaked with water. The cooled compressed boards were then soaked in water. The wet-pressed board swelled but a small amount, while the dry-pressed board swelled a relatively much greater amount. The wet-pressed board has taken a set in the hot pressing, and acquired a pressed stability along the thickness dimension.

From this evidence it was concluded that in hot-pressing a dry sawdust mix, the quickly dehydrated sawdust particles at the surface are comparable to the dry-compressed board, and that the central sawdust particles are somehow comparable to the wet-compressed board.

With this knowledge, the present invention provides water to soften both the surface and interior particles so that the entire mass is subjected to the same effective conditions and a uniform product results.

According to the present invention, the heating and pressing of the surface layers of any object to be hot molded, are initially effected on wet material by having present at the surface layer a supply of free water. This may be accomplished by the provision of a wet cloth or paper, or wet screens, or perforated metal cloth, or merely by applied water which may soak into and soften the particles of the surface layers of the mass to be molded. The softened particles thus flow to new positions in a more dense or compact structure, and acquire a permanent set. The slowly closing hot platens act upon the free water to convert it to steam, yet at final compression the particles retain sufficient water to be plastic for yielding to the pressure before being dried and set. As the steam is formed at the surface it moves to the interior of the relatively porous mixture being molded, and there it condenses because the interior is relatively cold at this time. The condensation wets the sawdust, and hence the inner layers which are thus wetted by the condensation are plasticized. The plasticized particles then change shape and flow, move to new positions of greater compactness under influence of the pressure, and then dry out and acquire a permanent set. As the heating progresses inwardly the plasticized layer moves inwardly, and the compacting thus progresses inwardly. This occurs until the innermost layers are thoroughly plasticized and compacted, and then dried out and set. From this point onward the layers of the board become more or less uniformly heated by virtue of the steam content within the material being pressed. The result is that the interior and the surface of the resulting body have substantially the same density and structure, whereby the panel is solid, uniform and homogeneous. It may be painted directly, with or without sanding. It is suitable for deep and irregular sanding and milling without the creation of defective appearance arising from non-uniform density and structure at different levels. It has increased dimensional stability.

Panels of about one-quarter inch (¼") thickness made from dry sawdust mixtures without added surface moisture, swell 18% in thickness after soaking one hour in water at room temperature. Like panels made with added surface moisture in like treatment swell only 15%. This improvement resides in the surface layers. However, the improvement in resistance to swelling is not major importance because of the addition to the mass throughout, of 0.75% by weight of paraffin, originally distributed in emulsion form, will reduce the swelling in the described test to 2.5%.

In carrying out the present invention, the sawdust employed is that obtainable in any sawmill or like operation. It is preferable for pleasing texture that large pieces or chips or slivers be screened from the sawdust, but it is not essential that the sawdust be screened or classified. It is preferable that it all passes a screen of 18 mesh. Such sawdust has, and for this invention should have, a large content of fines, which is a normal characteristic of wood sawdust. For the purpose of effecting ultimate homogenity in a molded form, it is quite essential to handle the sawdust as a mass, and to avoid a pouring movement or a falling movement of the sawdust in such a manner as would permit the separation of fines and coaser particles. For example, the pouring of such a sawdust mixture into a tray for molding would result in a settling of the fines to the bottom of the tray and the presentation of a top layer relatively deficient in fines. Such a board would have two differing surfaces, and the surface resulting from the top layer would show minute pits due to the presence of coarse particles and the lack of fines. Hence, for the present invention the dry molding mixture is pushed or loaded into its moldable form by moving it as a mass.

The economics of the process are greatly improved by avoiding the use of wet masses to be molded. Too much moisture makes blisters on opening the mold immediately after pressing and for this reason is desirably avoided. Wet masses are advantageous with respect to maintaining uniformity of mixture between fine and coarse particles. Hence, the use of a suitable dry mass introduces the already described problems relative to the uniformity of structure from face to face, not only as a result of possible particle separation, but as a result of insufficient moisture for adequate and uniform compacting of the particles.

The normal moisture content of millwork sawdust varies with mill conditions and with the season, and it may normally run, for example, from 8% to 15%. Sawmill sawdust usually requires drying for the present invention. Even at 20% moisture content the sawdust would be relatively dry to the feel of the hand. For the preferred practices of the present invention, the sawdust, after it is mixed with resin binder, should present a dry feeling mixture which has not more than about 15% moisture content, and preferably much less, and the lower the better for the functioning of the present invention. There is no lower critical limit as far as functions in the present invention are concerned, but the economics of drying to very low contents do not warrant such drying. It has also been found desirable for quick-opening of the press that the total amount of water (normal plus added content) in a molding mixture readied for hot-molding should lie in the range from about 12% to about 40% for panels ranging from ⅛ inch to ½ inch in thickness and having a density in the range roughly from about 65 lbs. to about 50 lbs. per cu. ft. as released from the press, the lower densities permitting of higher moisture content and the higher densities corresponding to the lower moisture content. The total water must be unequally distributed with as much as possible up to 5 parts per 100 parts of wood in the case of board panels, concentrated at the two surfaces of the mass to be heated. Addition of 1 part of water per 100 parts of wood at the two surfaces is effective and the desired effects increase up to a usage of 5 parts, and then diminish. Consequently said 5 parts is the preferred upper limit although not a top limit as to operability of the process. Thus, when the total water content is to be 14% and when 12% is the normal moisture content of the sawdust, 2% may be added water supplied to the moldable mass as it is formed, or before or during its formation, to concentrate and localize water at the two surfaces for the functions already described. The sawdust may be artificially dried, say to 9% moisture content, in which exemplary case 5% based on the wood may be added to the surfaces to bring the total moisture content to 14% and thereby somewhat enhance the effect of the surface moisture treatment.

The above-given ranges are practical ones for panel boards from sawdust, but it is to be understood that other forms and variations in density, or ratio of volume to surface-to-be-heated, may vary these practical and preferred limits set forth for panel boards.

Any binder is suitable so long as it may be provided in a form which may be uniformly distributed throughout the molding mixture, at the required moisture content, but thermosetting binders are preferred. Solutions or liquid-form resin-forming material may be employed and mixed with the sawdust, followed by suitable drying and mixing to uniformity. However, the preferred form of binder is a powder previously ground to a high degree of fineness, such as that of face powder, the finer the better. The strength of the board depends upon the amount and distribution of binder employed, and consequently the amount alone is not critical. For practical purposes, it is preferred to use a powdered two-stage thermosetting phenol-formaldehyde resin in quantity within the range of 4 to 8 parts by weight to 100 parts of wood substance in the sawdust employed. Use of less than 4 to 5 parts of resin binder fails to give adequate bond, but use above 8 parts is permitted up to the point where the resin becomes a matrix filled with sawdust particles, which limit is around 25 to 30 parts of resin per 100 of wood. The given range of 4 to 8 parts is one of practical economy only, and the requirement will vary inversely as the final density.

Since the invention involves control and location of water content, it is preferred to utilize repetitive or standardized conditions in commercial production by raising the natural moisture content of the sawdust from its normal, but variable content, to some fixed content with reference to which the amount of water to be added for the surface concentration, is measured. Therefore, by knowing the moisture content of the sawdust to be employed, when drier than a prescribed standard amount, and employing dry powdered resin, it is readily calculated how much water may be added to raise the moisture content of the dry molding mixture to a given percentage, for example, 15%, as such standard amount.

The step of adding such water may be combined with a step of adding any other treating material, such as coloring agent, salts, or waterproofing agents. Thus, it is used for adding wax to the mixture in order that the resulting board will have a desired degree of water resistance. To this end, a concentrated aqueous wax emulsion is diluted with water in proportions as necessary to add to the sawdust mix a required amount of wax for the water-proofing and a required amount of water for the moisture control or build-up. The amount of wax to be added determines the degree of water-proofness according to the other conditions. For practical purposes, wax within the range of 0.5 to 2 parts by weight is employed per 100 parts of wood substance. The wax may be ordinary paraffin wax or any other wax such as carnauba, ozokerite, bayberry, candelilla, Montan or chemical waxes, such as zinc stearate and many others.

The concentration of water at the surfaces for the present invention may be effected by placing a water-carrying body, such as a wet paper or cloth, in contact with the surfaces of the layers to be molded. However, this prevents the surface of the board assuming the surface characteristics of the mold surfaces against which it is formed. For practical purposes, and for simplicity, the water is applied as free water so that it is present in the surface layers first subjected to the heat of the platens. Where the dry mixture to be molded is formed on a plate, as a tray bottom, the plate surface is first uniformly wetted with a controlled amount of water before the molding mixture strikes the plate. After the mixture is in the tray, the top surface is uniformly wetted preferably with the same controlled amount of water, all being done so shortly before entering the press that the added water does not diffuse and equalize within the layer, thus preserving the higher surface concentration and wetness and the unequal distribution.

The use of water in the present invention may be reduced by employing expedients to preserve it in the press from loss therefrom, thus to employ small quantities over and over. Means to form a steam trap is thus employed, which also effects equalized conditions of the working area of the platens. In pressing, the press and contact thus may be so arranged that steam formed in the press is, to a large degree, confined against substantial loss during the pressing operation, thus efficiently to use and reuse the small amount of water by movement into the molding mass, rather than to permit escape of steam at edges of the mass. Such escape would negate the effect of surface moisture for a distance inwardly from the edges, on the order of about 3 inches. This is best explained by reference to the manner in which the whole operation is conducted.

The drawings illustrate a hopper 10 at the bottom of which there is a partial base closure 11 shown in dotted line, leaving the indicated area 12 as the discharge area from the hopper. A mechanism causing the hopper to feed uniformly without inducing sifting of fine particles away from coarse particles is not indicated, but a suitable one is described in my co-pending application Serial No. 40,383, filed July 23, 1948, now Patent No. 2,579,527. The ground 13 indicates a suitable support on which advances a tray 14 to be filled from the hopper, which tray may be considered as a portion of a mold for forming a panel in a suitable heated platen press having a punch platen entering the tray to heat and compress the charge therein. On each side of the hopper and spaced along it is a bank of spray nozzles, each bank being illustrated by one of the series, identified by numerals 15 and 16 in the order encountered by the tray in moving to the left in the drawing.

The tray comprises a thin sheet of metal 20 as a bottom against which the panel is to be molded on one face. The tray bottom 20 is framed by suitable wall-forming members, of which side-wall 21 and the advancing end-wall 22 are shown in Fig. 1. There is a companion side-wall 23 and there is also a companion end-wall 24, both shown in Fig. 5. For the purpose of proper functioning of the loading device associated with hopper 10 the leading end-wall 22 is very thick, as shown, without pertinence to the present invention.

Fig. 2 shows the tray 14 advancing and about to be filled from hopper 10. Nozzle bank 15 is shown issuing a fine spray 26 of water onto empty tray bottom 20, to deposit uniformly thereon, as a non-flowing body, a thin film or deposit of water in controlled amount as to generally, but not exactly uniform, distribution over the area. The nozzles are adjusted to issue a given quantity of water at a controlled constant pressure, and the tray 14 advances at a controlled constant speed. The numeral 27 indicates mechanism operatively related and associated with the speed and position of the tray, and with the supply of water to nozzle bank 15, so that the spray is in operation to strike all of the tray bottom, and so that, if required, the water is turned on and off, as when one tray at a time is involved.

Fig. 3 shows the tray 14 progressing to the point that molding mixture 28 is fed thereinto from hopper 10, thus to fall on top of the water film being deposited by spray 26. In this manner the bottom layer of the molding mixture becomes wetted, while the above portion is dry.

Fig. 4 shows the tray 14 advanced further to the point where the tray contents may be wetted by bank of nozzles 16, issuing spray 29. Nozzles 16 are controlled and adjusted to deposit approximately the same amount of water onto the top layer in the tray nozzles 15 have already deposited on the bottom of the tray. Numeral 30 represents mechanism similar to mechanism 27 for the same objectives. As the tray advances is the relationship shown in Fig. 4, it arrives at the end of the filling operation.

In Fig. 5, the tray 14 is shown to have passed the point where nozzles 15 affect the tray contents, so the spray 26 from said nozzles is lacking, having been cut off by operation of mechanism 27. Spray 29 is still playing on the top of the charge.

Fig. 6 shows the tray filled and away from the hopper, and both sprays 26 and 29 are cut off. The charging from the hopper is also shown cut off, by suitable means (not shown). Tray 14 now has a uniformly deep charge 30 wet at its bottom surface 31, wet at its top surface 32, and dry at the interior.

Fig. 7 shows the charged tray 14 of Fig. 6 moved to molding position onto a heated platen 35, having a temperature in the range from 300° F. to 400° F., but preferably at 330° F. to 350° F. Suitable guides, not shown, function to position the tray accurately on platen 35 to receive within the tray walls a punch platen 36, similarly heated, the surface 37 of which is the mold surface to act upon the wetted top layer 32 of charge 30.

The size of the heated platen 36 is preferably smaller than the tray area to receive it, for several reasons, one of which is pertinent to the preferred practices of the present invention. The heated platen 36 is backed by a foundation 38 of larger size providing backing for side plates all around the vertical walls of platen 36, of which side plates two are shown at 39 and 40. These plates extend the platen area substantially to fill the tray 14 upon entering, allowing a practical clearance of about ⅛ inch. They are readily removable from the position shown, being secured by suitable screws or bolts into the platen, as indicated at 42. These plates provide protection against damage by edge-chipping. Rather than chip a larger platen 36, the side plates take any accidental chipping and are replaceable. They also provide means to secure special surfacing means, or marking means, over platen 36, when such is desired. But for efficiently using the water and moisture in the charge 30, the side plates all around, such as 39 and 40, project beyond the platen surface and provide an inverted tray-like space as the upper platen of the press. The edges, therefore, compress the charge 30 to higher density than does the platen 36. This minimizes loss of vapor from edges of the mold, and it provides a recess or pressure chamber in which pressure, and hence vapor movement, are equalized over the area of the panel. Thus, the plasticizing effect and the resulting compacting tend to equalize over the area of the panel. This advantage is more pronounced in small-sized panels, than in large-sized panels, but it is desirable and beneficial in panels of all sizes.

Fig. 8 shows the press of Fig. 7 in final closed position. As shown, the press is used with follow-up-pressure for the best results. The press slowly moves in and increases actual pressure as the charge 30 responds to it. The highest degree of uniformity is thus obtained.

But the invention may also be used in presses which operate by use of stops when it is promptly closed to the ultimate point desired. To some degree the quick closure to ultimate position inhibits the full movement of the particles into new positions when softened by the water received and lost in the pressing by the various layers progressively inwardly of the charge. Both kinds of press operations are contemplated within the terms here used, signifying molding by heat and pressure.

In practical operation, the time of pressing of a panel board with platens at 350° F., and at 15% to 20% moisture content, including the applied water, varies with the thickness of the panel to be formed, and with other factors. The following Table I exemplifies the relationships in using a press with platens not providing a steam trap or moisture seal:

Table I

| Density, Lbs. Cu. Ft. | Thickness, Inches | Platen Pressure, Lbs. Sq. In. | Platen Temp. °F. | Time Minutes |
|---|---|---|---|---|
| 50 | ¼ | 140 | 350 | 7 |
| 55 | ¼ | 200 | 350 | 7 |
| 50 | ⅛ | 140 | 350 | 4½ |
| 55 | ⅛ | 200 | 350 | 4½ |

Where the mixture is dry at not over about 12% total moisture content with a usage of about 6 parts of resin, with adequately wetted surfaces, and with a moisture trap, the press may be quickly opened with no tendency to blister at densities up to about 65 lbs. per cu. ft., without need to delay the opening to effect prior dissipation of the pressure within the molded mass. At densities lower than about 45 lbs. per cu. ft. the particles do not fit well together and the product is therefore relatively weaker and more porous. These practical considerations dictate a preferred density range from 45 to 65 lbs. per cu. ft.

The pressing cycle is much longer than the tray filling cycle, and because of that, one hopper may fill a bank of trays to be molded at one time in a multi-opening press, such as a ten-opening press. However, the mechanisms for such commercial operations form no part of the present invention.

The benefits resulting from practice of the present invention may be understood from the comparative results of the following examples of Table II carried out with the same materials and apparatus, and generally the same procedure, some without surface wetting, and some with added water applied by the spraying procedure above described with reference to the drawings:

In Table II:

Column 1 designates an example for reference purposes.

Column 2 designates a record number.

Columns 3 refer to moisture content, in which column: 3a is the parts of water per 100 parts of bone-dry wood substance as loaded into the tray from the hopper; 3b is the amount of water added per 100 parts of bone-dry wood to the bottom surface in the tray; 3c is the amount of water added per 100 parts of bone-dry wood to the top surface in the tray.

Column 4 represents the amount of thermosetting phenol-formaldehyde resin powder expressed in percent of resin solids based on the bone-dry weight of the mixture, that is, bone-dry wood substance plus resin solids.

Column 5 represents the percent of wax expressed as parts of paraffin wax per 100 parts of bone-dry wood plus resin solids.

Column 6 represents mechanical pressure in pounds per square inch, of platens at 350° F.

Column 7 represents pressing time in minutes.

Column 8 indicates use or not of a steam trap as illustrated in Figs. 7 and 8.

Column 9 represents the thickness of the resulting panel in inches.

Column 10 represents the density of the resulting panel in pounds per cu. ft. as removed from the press.

Column 11 represents the transverse strength expressed as modulus of rupture in pounds per square inch.

Table II.—Panel board from Ponderosa pine sawdust

| 1 | 2 | 3a | 3b | 3c | 4 | 5 | 6 | 7 | 8 | 9 | 10 | 11 |
|---|---|---|---|---|---|---|---|---|---|---|---|---|
| | | Moisture Content— | | | | | Pressing | | | Panel | | |
| Example No. | Record No. | S | B | T | Per Cent Resin | Per Cent Wax | P. S. I. | Minutes | Steam Trap | Thickness, Inches | Density, lbs./cu. ft. | M. R., lbs./sq. in. |
| 1 | L-1 | 7 | 0 | 0 | 8.27 | 0 | 210 | 7 | No | .308 | 39.7 | 626 |
| 2 | L-2 | 11 | 0 | 0 | 8.27 | 0 | 210 | 7 | No | .281 | 44.1 | 980 |
| 3 | L-3 | 15 | 0 | 0 | 8.27 | 0 | 210 | 7 | No | .263 | 46.4 | 1,119 |
| 4 | L-4 | 20 | 0 | 0 | 8.27 | 0 | 210 | 7 | No | .253 | 48.4 | 1,537 |
| 5 | L-5 | 7 | 6.5 | 6.5 | 8.27 | 0 | 210 | 7 | No | .257 | 47.9 | 1,635 |
| 6 | L-6 | 11 | 4.5 | 4.5 | 8.27 | 0 | 210 | 7 | No | .250 | 48.9 | 1,699 |
| 7 | L-7 | 15 | 2.5 | 2.5 | 8.27 | 0 | 210 | 7 | No | .248 | 49.7 | 1,951 |
| 8 | L-8 | 20 | 0 | 0 | 8.27 | 0.75 | 210 | 7 | No | .250 | 49.4 | 1,603 |
| 9 | L-9 | 15 | 2.5 | 2.5 | 8.27 | 0.75 | 210 | 7 | No | .245 | 50.0 | 1,729 |
| 10 | L-43 | 14 | 0 | 0 | 6.00 | 0.75 | 250 | 7 | Yes | .244 | 63.5 | 4,242 |
| 11 | 188 | 25 | 7.5 | 7.5 | 8.27 | 0.75 | 138 | 15 | No | .263 | 48.9 | 2,195 |
| 12 | 202 | 12 | 2.5 | 2.5 | 8.27 | 0.75 | 203 | 7 | Yes | .292 | 54.5 | 3,680 |
| 13 | 206 | 8 | 2.5 | 2.5 | 5.73 | 0.75 | 291 | 10 | No | .234 | 62.8 | 4,220 |

From the foregoing it is readily appreciated that the invention provides an improved process and yields an improved product which in the form of a flat panel has many practical advantages. By the step of using water in a manner to plasticize the surface layers prior to final hot-pressing, the result is to increase the flexural and impact strengths by 15% to 20%, as well as to improve the physical character as described. In the manufacture of doors having inset panels, the door panels may be formed from waste of the mill itself. The door panel may be cut from larger pieces and machined with no danger of chipping. When bevelled the door panels present no difference in texture between the sanded molded surfaces and the milled surfaces from within the molded panel. The panel may be varnished or painted without special filling or priming to hide pores or pits.

Although it is preferred to practice the present invention on both faces of the mass, it is to be understood that there may be special cases where the improved surface need be on but one face. Thus, in the illustrations, the spray on one face, or the wetting on one face, is readily dispensed with without departure from the invention.

Many other uses of the product of the present invention are opened up by the improvement in the product of the present invention, however it is applied within the scope of the appended claims.

I claim:

1. The method which comprises applying a film of water to the surface of a metal sheet, covering said wetted surface with a dry uniform mixture of wood sawdust and solid heat-activatable binder therefor in an amount in the range from 4 to 25 parts by weight to 100 parts of bone-dry wood in the sawdust, applying water to the top of said mixture to wet the particles thereof, the total amount of water in the resulting mass being in the range from 12 to 40 parts by weight to 100 parts of bone-dry wood substance, and heating and pressing said mixture to a density in the range from 45 to 65 lbs. per cu. ft. on said sheet between platens having a temperature in the range from 300° F. to 400° F. while the two faces of said mixture are initially wet to dry and bind the mixture as an integral molded body.

2. The method which comprises applying a film of water to a mold-like surface, covering said wetted surface with a dry mixture of wood sawdust and heat-activatable binder therefor in an amount in the range from 4 to 25 parts by weight of binder to 100 parts of bone-dry wood, applying water to the top of said mixture to wet the particles thereof, the moisture content of the sawdust plus all the added water totaling in the range from 12 to 40 parts by weight per 100 of bone-dry wood in the sawdust, and heating and pressing said mixture on said surface with platens having temperature above the boiling point of water at the faces of the mixture while the two faces of said mixture are initially wet and the interior is substantially dry to dry and bind the mixture as an integral molded body.

3. The method which comprises applying a film of water to the surface of a metal sheet, covering said wetted surface with a dry mixture of wood sawdust and heat-activatable binder therefor in an amount in the range from 4 to 25 parts by weight of binder to 100 parts of bone-dry wood, applying water to the top of said mixture to wet the particles thereof, the moisture content of the sawdust plus all the added water totaling in the range from 12 to 40 parts by weight per 100 of bone-dry wood in the sawdust, and heating and pressing said mixture on said sheet between platens having a temperature in the range from 300° F. to 400° F. while the two faces of said mixture are initially wet and the interior is substantially dry to dry and bind the mixture as an integral molded body.

4. The method which comprises spraying a predetermined amount of water in substantially uniform distribution onto a predetermined area of the surface of a metal sheet, covering said wetted area uniformly by weight with a substantially uniformly dry mixture of wood sawdust and solid heat-activatable binder therefor in an amount in the range from 4 to 25 parts by weight to 100 parts of bone-dry wood in the sawdust, spraying a predetermined amount of water on top of the dry mixture in substantially uniform distribution over said predetermined area, whereby to form a sawdust body having a dry interior and water-wet faces, the total amount of water in the moldable mass deriving from the two sprayings and from the moisture content of the dry mixture being not more than 40 parts by weight per 100 parts of the dry sawdust particles in the mixture, and heating and pressing said body between heated platens having a temperature in the range from 300° F. to 400° F., whereby said wetted faces contain water-plasticized particles of sawdust which yield in shape under the applied pressure and become compacted, bound and dried by the heat into a uniform surface layer free from voids.

5. The method which comprises spraying a predetermined amount of water in substantially uniform distribution onto the surface of a metal sheet of predetermined area, covering said wetted surface with a substantially uniformly dry mixture of wood sawdust and solid heat-activatable thermosetting resin binder therefor in substantially uniform distribution by weight over said wetted surface, said mixture having a predetermined moisture content and from 4 to 25 parts by weight of said binder to 100 parts of bone-dry wood in the sawdust, spraying a predetermined amount of water in substantially uniform distribution over the top of said dry mixture to wet the uppermost particles thereof, the total amount of water in the moldable mass deriving from the two sprayings and from the moisture content of the dry mixture being not more than 40 parts by weight per 100 parts of the dry sawdust particles in the mixture, and heating and pressing said mixture on said sheet between platens having a temperature in the range from 300° F. to 400° F. while the two faces of said mixture are initially wet in order to dry and bind the mixture as an integral molded body.

6. The method of hot-molding which comprises forming a layer of a moldable mass comprising wood particles a major portion of which is wood sawdust, solid heat-activatable binder therefor uniformly distributed throughout the sawdust in an amount in the range from 4 to 25 parts by weight per 100 parts of bone-dry wood in the sawdust, and added free water, the total water content of the mass being not more than 40 parts by weight to 100 parts of the bone-dry wood in the sawdust, said layer having substantially dry sawdust which is substantially free of said added free water constituting the major portion of its interior and sawdust which is wet with said free water located at each surface of said layer which is to be subjected to direct contact with a heated mechanical-pressure element, said free water being present to soften and plasticize the sawdust particles at the beginning of the hot-molding to facilitate deformation and compression thereof under mechanical pressure without disruption of the wood particles, and subjecting said layer to heat and mechanical pressure including application over the wet surface of the layer of a heated mechanical-pressure element having a temperature in the range from 300° F. to 400° F., whereby the plasticized surface particles are deformed, compressed and intermeshed in the initial stage of hot-molding and then dried and thereby set by loss of water content as vapor to the colder interior where the vapor condenses and plasticizes particles progressively inwardly from said heated element.

7. The method of hot-molding which comprises forming a layer of a moldable mass comprising wood particles a major portion of which is wood sawdust, solid heat-activatable thermosetting-resin-forming material as binder therefor uniformly distributed throughout the sawdust in an amount in the range from 4 to 25 parts by weight per 100 parts of bone-dry wood in the sawdust, and added free water, the total water content of the mass being not more than 40 parts by weight to 100 parts of the bone-dry wood in the sawdust, said layer having substantially dry sawdust which is substantially free of said added free water constituting the major portion of its interior and sawdust which is wet with said free water located at every surface of said layer which is to be subjected to the application of a heated mechanical-pressure-element, said free water being present to soften and plasticize the sawdust particles at the beginning of the hot-molding to facilitate deformation and compression thereof under mechanical pressure without disruption of the wood particles, and subjecting said layer to heat and mechanical pressure including application over the wet surface of the mass of a heated mechanical-pressure element having a temperature in the range from 300° F. to 400° F., whereby the plasticized surface particles are deformed, compressed and intermeshed in the initial stage of hot-molding and then dried and thereby set by loss of water content as vapor to the colder interior where the vapor condenses and plasticizes particles progressively inwardly.

8. The method of hot-molding board-like panels which comprises forming a layer of a moldable mass comprising wood particles a major portion of which is wood sawdust, solid heat-activatable binder therefor uniformly distributed throughout the sawdust in an amount in the range from 4 to 25 parts by weight per 100 parts of bone-dry wood in the sawdust, and added free water, the total water content of the layer being not more than 40 parts by weight to 100 parts of the bone-dry wood in the sawdust, said layer having substantially dry sawdust which is substantially free of said added free water constituting the major portion of its interior and sawdust which is wet with said free water located at the two faces of the layer to be subjected to the application of heated mechanical-pressure elements, said free water being present in quantity to soften and plasticize the sawdust particles at the beginning of the hot-molding to facilitate deformation and compression thereof under mechanical pressure without disruption of the wood particles, and subjecting said layer to heat and mechanical pressure by application over each wet face of a heated mechanical-pressure element having a temperature in the range from 300° F. to 400° F., whereby the plasticized surface particles are deformed, compressed and intermeshed in the initial stage of hot-molding and then dried and thereby set by loss of water content as vapor to the colder interior where the vapor condenses and plasticizes particles progressively inwardly.

9. The method of hot-molding board-like panels which comprises forming a layer of a moldable mass comprising wood particles a major portion of which is wood sawdust, solid heat-activatable-thermosetting-resin-forming material as binder therefor uniformly distributed throughout the sawdust in an amount in the range from 4 to 25 parts by weight per 100 parts of bone-dry wood in the sawdust, and added free water, the total water content being not more than 40 parts by weight to 100 parts of the bone-dry wood in the sawdust, said layer having substantially dry sawdust which is substantially free of said added free water constituting the major portion of its interior and sawdust which is wet with said free water located at the two faces of the layer to be subjected to the application of heated mechanical-pressure elements, said free water being present in quantity to soften and plasticize the sawdust particles at the beginning of the hot-molding to facilitate deformation and compression thereof under mechanical pressure without disruption of the particles, and subjecting said layer to heat and mechanical pressure by application over each wet face of a heated mechanical-pressure element having a temperature in the range from 300° F. to 400° F., whereby the plasticized surface particles are deformed, compressed and intermeshed in the initial stage of hot-molding and then dried and thereby set by loss of water content as vapor to the colder interior where the vapor condenses and plasticizes particles progressively inwardly.

10. The method of forming synthetic lumber which comprises thoroughly mixing substantially dry wood sawdust with a binding quantity of solid heat-activatable binder material therefor in an amount in the range from 4 to 25 parts by weight to 100 parts of bone-dry wood in the sawdust to form a substantially dry uniform sawdust-base molding mixture, distributing said mixture into the form of a moldable layer at substantially uniform density and thickness for subjecting the resulting layer to molding heat and pressure to form a substantially uniformly thick and dense integrated panel, applying to at least one of the faces of the layer free water in quantity to wet the sawdust particles thereof at said surface leaving the interior substantially dry and to provide a total mass consisting of said facially wetted portion of the original mix and said unwetted portion of the original mix including such material located at said interior such that the total water content including any moisture in the original dry mixture at the initiation of molding is in the range from 12 to 40 parts by weight to 100 parts of bone-dry wood substance, subjecting the so-treated layer to heat and mechanical pressure between heated platens having a temperature in the range from 300° F. to 400° F. at a pressure to impart to the resulting panel a density in the range from 45 to 65 lbs. per cu. ft. and for a sufficient time to integrate and bind the mixture, whereby the free water at a resulting wetted surface retards the heating thereof and softens the surface-layer particles therein for deforming and flowing into compact relation, and whereby the adjacent platen quickly volatilizes said free surface water which passes as vapor into the cooler interior and condenses, thus progressively wetting and plasticizing the sawdust particles from said surface inwardly of the moldable layer as the heat from the platen progresses inwardly, said plasticized particles deforming and flowing more readily under the influence of the mechanical pressure into compact form.

11. The method of forming synthetic lumber which comprises thoroughly mixing substantially dry wood sawdust with a binding quantity of finely divided solid thermosetting resin-forming material therefor in an amount in the range from 4 to 25 parts by weight to 100 parts of bone-dry wood in the sawdust to form a substantially dry uniform sawdust-base molding mixture, distributing said mixture into the form of a moldable layer at substantially uniform density and thickness for subjecting the resulting layer to molding heat and pressure to form a substantially uniformly thick and dense resin-bound panel, applying to each of the faces of said layer free water in quantity to wet the sawdust particles thereof at the surface leaving the interior substantially dry and to provide a total mass consisting of said wetted original mix at the two wetted faces of the said layer and said original dry mix at the interior of the layer such that the total water content at the initiation of molding is in the range from 12 to 40 parts by weight to 100 parts of bone-dry wood substance, subjecting the resulting so-treated layer to heat and mechanical pressure between heated platens having a temperature in the range from 300° F. to 400° F. at a pressure to impart to the resulting panel a density in the range from 45 to 65 lbs. per cu. ft. and for a sufficient time to thermoset the resin material and bind the mixture, whereby the free water at the surfaces retards the heating of the surfaces and softens the surface-layer particles for deforming and flowing into compact relation, and whereby the platens quickly volatilize said surface water which passes as vapor into the cooler interior and condenses, thus progressively wetting and plasticizing the sawdust particles from the surface to the center of the moldable layer as the heat from the platens progresses inwardly, said plasticized particles deforming and flowing more readily under the influence of the mechanical pressure into compact form.

12. The method of forming synthetic lumber which comprises thoroughly mixing substantially dry wood sawdust with a binding quantity of solid heat-activatable binder material therefor in an amount in the range from 4 to 25 parts by weight to 100 parts of bone-dry wood in the sawdust to form a substantially dry uniform sawdust-base molding mixture, forming said mixture into a moldable layer for subjecting the resulting layer to molding heat and pressure to form an integrated molded product, applying at each face of the layer which is to be subjected to direct contact with a heated platen free water in quantity to wet the sawdust particles thereof at said surface leaving the interior substantially dry and to provide a total mass consisting of said wetted original dry mix at each said wetted face of the layer and said unwetted portion of the original dry mix including such material located at the interior of said layer such that the total water content at the initiation of molding is in the range from 12 to 40 parts by weight to 100 parts of bone-dry wood substance, subjecting the so-treated layer to heat and mechanical pressure by application of pressing elements including at each wetted surface heated platens having a temperature in the range from 300° F. to 400° F. at a densifying pressure to impart to the resulting molded product a density in the range from 45 to 65 lbs. per cu. ft. and for a sufficient time to integrate and bind the mixture, whereby the free water at the surfaces retards the heating of the surfaces and softens the surface layer particles for deforming and flowing into compact relation, and whereby the heating quickly volatilizes said surface water which passes as vapor into the cooler interior and condenses, thus progressively wetting and plasticizing the sawdust particles inwardly from the originally wetted surface of the moldable layer as the heat progresses inwardly, said plasticized particles deforming and flowing more readily under the influence of the mechanical pressure into compact form.

13. The method of forming synthetic lumber which comprises thoroughly mixing substantially dry wood sawdust with a binding quantity of finely divided solid thermosetting resin-forming material therefor in an amount in the range from 4 to 25 parts by weight to 100 parts of bone-dry wood in the sawdust to form a substantially dry uniform sawdust-base molding mixture, forming said mixture into a moldable layer for subjecting the resulting layer to molding heat and pressure to form a resin-bound molded product, applying to a pre-selected portion of a surface of the moldable layer which portion is to be subjected to direct contact with a heated platen, free water in quantity to wet the sawdust particles at the pre-selected portion of said surface leaving the interior substantially dry and to provide a total mass consisting of said wetted portion of the original mix at said pre-selected portion of the surface of the layer and the unwetted portion of the original mix including such material located at said interior of the layer such that the total water content of the layer at said pre-selected portion at the initiation of molding is in the range from 12 to 40 parts by weight to 100 parts of bone-dry wood substance, subjecting the so-treated layer to heat and mechanical pressure between heated molding platens having a temperature in the range from 300° F. to 400° F. at a densifying pressure to impart to the resulting molded product a density in the range from 45 to 65 lbs. per cu. ft. and for a sufficient time to thermoset the resin material and bind the mixture, whereby the free water at the pre-selected wetted portion of the surface retards the heating of said portion and softens the sawdust particles therein for deforming and flowing into compact relation, and whereby the heating quickly volatilizes said surface water which passes as vapor into the cooler interior and condenses, thus progressively wetting and plasticizing the sawdust particles from the pre-selected portion of the surface of the moldable layer inwardly as the heat progresses inwardly, said plasticized particles deforming and flowing more readily under the influence of the mechanical pressure into compact form.

14. The mehod of forming a molded body of wood sawdust base which comprisets mixing substantially dry wood sawdust with a binding quantity of solid heat-activatable binder material therefor in an amount in the range from 4 to 25 parts by weight to 100 parts of bone-dry wood in the sawdust to form a substantially dry uniform sawdust-base molding mixture, forming said mixture into a moldable layer for subjecting the resulting layer to molding heat and pressure to form an integrated molded product, applying to a pre-selected portion of a surface of the moldable layer which portion is to be subjected to direct contact with a heated platen, free water in quantity to wet the sawdust particles at the pre-selected portion of said surface leaving the interior substantially dry and to provide a total mass consisting of said wetted portion of the original mix of said pre-selected portion of the surface of the layer and the unwetted portion of the original mix including such material located at said interior of the layer such that the total water content of the layer at said pre-selected portion at the initiation of molding is in the range from 12 to 40 parts by weight to 100 parts of bone-dry wood substance, subjecting the so-treated moldable layer to heat and mechanical pressure between heated molding platens having a temperature in the range from 300° F. to 400° F., and at a densifying pressure to impart to the resulting molded product a density in the range from 45 lbs. to 65 lbs. per cu. ft. for a sufficient time to integrate and bind the mixture, whereby the free water at the pre-selected wetted portion of the surface retards the heating of said portion and softens the sawdust particles therein for deforming and flowing into compact relation, and whereby the adjacent heated platen quickly volatilizes said surface water which passes as vapor into the cooler interior and condenses, thus progressively wetting and plasticizing the sawdust particles from the pre-selected portion of the surface of the moldable layer inwardly as the heating progresses inwardly, said plasticized particles deforming and flowing more readily under the influence of the mechanical pressure into compact form.

15. The method of forming a molded body of wood sawdust base which comprises mixing substantially dry wood sawdust with a binding quantity of finely divided solid thermosetting resin-forming material therefor in an amount in the range from 4 to 25 parts by weight to 100 parts of bone-dry wood in the sawdust to form a substantially dry uniform sawdust-base molding mixture, forming said mixture into a moldable layer for subjecting the resulting layer to molding heat and pressure to form a resin-bound molded product, applying to but a single face of said layer free water in quantity to wet the sawdust particles thereof on the surface leaving the interior of the layer substantially dry and provide a total mass consisting of said wetted portion of the original dry mix at said wetted surface and the unwetted portion of the original dry mix located at said interior and at said other face of the layer such that the total water content at the initiation of molding is in the range from 12 to 40 parts by weight to 100 parts of bone-dry wood substance, subjecting the so-treated moldable layer to heat and mechanical pressure by application of heated platens having a temperature in the range from 300° F. to 400° F., and at a densifying pressure to impart to the resulting molded product a density in the range from 45 lbs. to 65 lbs. per cu. ft. for a sufficient time to thermoset the resin material and bind the mixture, whereby the free water at the wetted surface retards the heating of said surface and softens the sawdust particles therein for deforming and flowing into compact relation and whereby the heated platen at the wetted surface quickly volatilizes said surface water which passes as vapor into the cooler interior and condenses, thus progressively wetting and plasticizing the sawdust particles inwardly from the wetted surface of the moldable layer as the heating progresses inwardly, said plasticized particles deforming and flowing more readily under the influence of the mechanical pressure into compact form.

FREDERICK WEYERHAEUSER.

REFERENCES CITED

The following references are of record in the file of this patent:

UNITED STATES PATENTS

| Number | Name | Date |
|---|---|---|
| 1,905,225 | Hawerlauder | Apr. 25, 1933 |
| 2,183,857 | Turkington | Dec. 19, 1939 |

FOREIGN PATENTS

| Number | Country | Date |
|---|---|---|
| 115,406 | Australia | June 24, 1942 |

OTHER REFERENCES

"Continuous Structural Board From Sawdust," Modern Plastics, September 1947, pp. 89–91.